United States Patent [19]
Funahashi et al.

[11] Patent Number: 4,755,365
[45] Date of Patent: Jul. 5, 1988

[54] METHOD OF PRODUCING HIGH PURITY ZIRCONIA POWDER FROM ZIRCON POWDER

[75] Inventors: Toshihiko Funahashi; Ryoji Uchimura; Yukio Oguchi; Kenichi Ueda, all of Chiba, Japan

[73] Assignee: Kawasaki Steel Corporation, Hyogo, Japan

[21] Appl. No.: 914,020

[22] Filed: Oct. 1, 1986

Related U.S. Application Data

[63] Continuation-in-part of Ser. No. 715,166, Mar. 22, 1985, abandoned.

[51] Int. Cl.$^4$ ............................................. C01G 25/02
[52] U.S. Cl. ..................................... 423/75; 423/325; 423/608
[58] Field of Search ............... 423/74, 75, 69, 608, 423/337, 340, 325

[56] References Cited

U.S. PATENT DOCUMENTS

| | | | |
|---|---|---|---|
| 2,072,889 | 3/1937 | Kinzie et al. | 423/75 |
| 3,849,532 | 11/1974 | Deneke et al. | 423/69 |
| 4,118,464 | 10/1978 | Cutler | 423/75 |

FOREIGN PATENT DOCUMENTS

| | | | |
|---|---|---|---|
| 632447 | 12/1961 | Canada | 423/69 |
| 657746 | 2/1963 | Canada | 423/75 |
| 543675 | 1/1932 | Fed. Rep. of Germany . | |
| 535011 | 3/1941 | United Kingdom | 423/69 |

OTHER PUBLICATIONS

Patent Abstracts of Japan, vol. 7, No. 86 (Showa Denka K.K.) 28-01-1983.
Patent Abstracts of Japan, vol. 7, No. 77 (Showa Denka K.K.) 20-01-1983.

*Primary Examiner*—Robert L. Stoll
*Attorney, Agent, or Firm*—Austin R. Miller

[57] ABSTRACT

In producing zirconia powder by desiliconizing heat treatment of a mixture of zircon powder and a powdery carbon-containing material, optionally with addition of a zirconia stabilizing oxide such as calcia or yttria, in a nonoxidizing atmosphere the conversion of silica into SiO and dissipation of gaseous SiO are promoted and completed by performing the heat treatment under reduced pressure, viz. at a pressure not higher than 0.6 atm. Zirconia powder of very high purity can surely be obtained, even when a large batch of the raw material mixture is treated, by performing the reduced pressure desiliconizing heat treatment in two stages: first at 1200°–1550° C. until almost complete conversion of silica to SiO and then at 1550°–2000° C. The mole ratio of C to $SiO_2$ in the raw material mixture must be 0.4–2.0. For further enhancement of purity, zirconia powder obtained by the desiliconizing treatment may be subjected to oxidation heat treatment. Efficiency of the desiliconizing heat treatment can be enhanced by precedingly forming the raw material mixture into porous lump(s) whose bulk density is in the range from 0.7 to 2.0.

9 Claims, 3 Drawing Sheets

# METHOD OF PRODUCING HIGH PURITY ZIRCONIA POWDER FROM ZIRCON POWDER

This application is a continuation-in-part of application Ser. No. 715,166, filed Mar. 22, 1985, now abandoned.

BACKGROUND OF THE INVENTION

This invention relates to a method of producing a powder of high purity zirconia, which may be unstabilized zirconia or stabilized or partially stabilized zirconia, by heating a zircon powder in the presence of carbon.

Zirconia, i.e. zirconium oxide $ZrO_2$, has been used as a refractory material in the steel manufacturing and glass manufacturing industries since the melting point of this material exceeds 2700° C. Recently, zirconia is acquiring new and widening uses in various fields. For example, it serves as an important raw material for producing optical glasses, new abrasives, piezoelectric elements, solid electrolyte cells useful as oxygen sensors, ceramic capacitors or some other electronic devices.

Crystallographically, pure zirconia belongs to the monoclinic system at normal temperature. However, it is not fully stable and reversibly transforms into a tetragonal phase crystal structure at about 1100° C. with a relatively large change in volume. Accordingly, practically pure zirconia is commonly called unstabilized zirconia. Due to the change in volume accompanying the transformation, a sintered body of unstabilized zirconia is not high in mechanical strength even at normal temperature. As a solution to this problem, it is well known to obtain stabilized or partially stabilized zirconia having a cubic phase crystal structure by the addition of a stabilizing oxide such as, e.g., CaO or $Y_2O_3$ which forms a solid solution with $ZrO_2$. Besides the aforementioned uses of zirconia, stabilized or partially stabilized zirconia which is high in both strength and toughness has prospective uses in the field of so-called engineering ceramics.

A popular raw material for producing zirconia is zircon, which is a zirconium silicate mineral represented by the formula $ZrO_2.SiO_2$ or $ZrSiO_4$ and decomposes into $ZrO_2$ and $SiO_2$ at about 1530° C. Therefore, producing zirconia from zircon means separating silica from zircon.

A well known method for producing zirconia from zircon is an arc furnace fusion method in which a mixture of zircon sand, carbon and iron scrap, with the addition of a stabilizing oxide when producing stabilized zirconia, is heated in an arc furnace. Decomposition and reduction reactions and fusion of the reaction system take place, and the $Si_2$ component separates from the $ZrO_2$ component by dissipation of the silicon oxide in reduced form into the gas phase and/or by formation of ferrosilicon by reaction with iron. This method is capable of producing zirconia at a relatively low cost and is suited to the production on a large scale. However, this method cannot provide high purity zirconia, and zirconia as the product of this method is in the form of a hard block which needs to be pulverized with consumption of large energy.

Another known method is an alkali fusion method. In this method, a mixture of zircon sand and an alkali is melted to undergo reaction which gives an alkali silicate and an alkali zirconate. The silicates can be washed away. By a process including an acid treatment the zirconate is converted into zirconium oxychloride $ZrOCl_2$, which is soluble in water and therefore can easily be converted into zirconium hydroxide. Heat treatment of thus obtained zirconium hydroxide gives zirconia in powder form. By this method it is possible to produce very high purity zirconia, but this method is low in productivity and very high in the production cost because of employing a roundabout process including many kinds of reactions.

As a still different method, Japanese patent applications publication Nos. 58-9808 and 58-15021 propose to accomplish desiliconizing of zircon by heating a granulated mixture of zircon sand and carbon powder, with the addition of a stabilizing oxide if desired, in a nonoxidizing atmosphere in the presence of granular carbon which is disposed adjacent to the granules of the raw material mixture. By this heat treatment the silica component of zircon gasifies in a reduced form and then reacts with the granular carbon. Accordingly silicon carbide is obtained together with zirconia. However, this method is relatively low in productivity and high in the energy cost because the reactions in this method need to be carried out at a very high temperature and for a long period of time, and it is difficult to obtain zirconia of high purity.

Also U.S. Pat. No. 4,118,464 shows a similar method for producing zirconia together with silicon carbide. A powder mixture of zircon and carbon is pelletized and surrounded with a matrix of another solid phase of additional carbon. In that state a heat treatment is made in a nonoxidizing atmosphere to reduce silica contained in zircon to silicon monoxide in gaseous phase and to allow the gaseous silicon monoxide to diffuse into and react with the surrounding carbon phase to form silicon carbide. According to the description of an example of this method the heat treatment was performed at about 1485° C. for 250 min, resulting in that the reaction was 98.8% complete and produced zirconia with a slight amount of zircon. This is illustrative of the difficulty of accomplishing complete desiliconization of zircon.

SUMMARY OF THE INVENTION

It is an object of the present invention to provide a method of surely, efficiently and economically producing a high purity zirconia powder, which may be either unstabilized zirconia or stabilized or partially stabilized zirconia, from a zircon powder.

In essence, the present invention is a method of producing a high purity zirconia powder, which comprises the steps of preparing a raw material mixture comprising a zircon powder and a powdery carbonaceous or carbon-containing material such that the mole ratio of C, which is contained in the carbon-containing material and does not gasify at temperatures below 1000° C. in a nonoxidizing atmosphere, to $SiO_2$ contained in the zircon powder is in the range from 0.4 to 2.0, and subjecting the raw material mixture to a desiliconizing heat treatment in a nonoxidizing atmosphere of which the pressure is not higher than 0.6 atm, wherein the desiliconizing heat treatment is a combination of a first-stage heat treatment which is performed at a temperature in the range from 1200° to 1550° C. until almost complete separation of silica from the zircon powder and a second-stage heat treatment which is performed at a temperature in the range from 1550° to 2000° C. for substantially completely converting silica in the mixture under heat treatment into gaseous SiO and dissipating the gaseous SiO.

When producing stabilized or partially stabilized zirconia, the raw material mixture further comprises at least one stabilizing metal oxide or alternatively at least one metal salt which turns into such a metal oxide at a temperature not higher than the temperature employed at the aforementioned first-stage heat treatment.

The primary feature of the invention resides in that the desiliconizing heat treatment of a zircon-carbon mixture is carried out under reduced pressure. The mechanism of the desiliconizing is represented by the following equations.

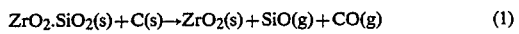

$$ZrO_2 \cdot SiO_2(s) + C(s) \rightarrow ZrO_2(s) + SiO(g) + CO(g) \quad (1)$$

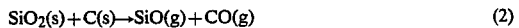

$$SiO_2(s) + C(s) \rightarrow SiO(g) + CO(g) \quad (2)$$

For continuous proceeding of the reaction of the equation (1) under the atmospheric pressure, thermodynamical calculation from the reaction of the equation (2) gives an answer that the reaction temperature must be maintained at 1750° C. at the lowest. The difficulty of continuous reaction at lower temperatures is attributed mainly to the fact that the saturated vapor pressure of SiO is as low as $6.3 \times 10^{-2}$ atm at 1500° C. and $3.5 \times 10^{-3}$ atm at 1300° C. When the desiliconizing heat treatment is carried out under reduced pressure, the thermodynamically lower limit of the temperature becomes considerably lower than 1750° C. By calculation from the equation (2), the lower limit of the temperature becomes 1640° C. when the reaction takes place at a pressure of 0.1 atm, and further lowers to 1540° C. at 0.01 atm and to 1450° C. at 0.001 atm. That is, the desiliconizing heat treatment temperature can be lowered by about 100° C. by reducing the pressure by one order. Therefore, the method according to the invention can achieve almost complete removal of silica from zircon by heating at a relatively low temperature and in a relatively short time. The upper limit of the pressure at the desiliconizing heat treatment is set at 0.6 atm with consideration of both the manner of dependence of the amount of residual silicon in the obtained zirconia and the convenience of practical operations.

Also it is an important feature of the invention that the reduced pressure heat treatment of the raw material mixture for desiliconization of performed in two stages as defined in the statement of the invention. By the employment of this two-stage heat treatment method the favorable effect of the treatment under reduced pressure can be fully obtained even when a large batch of the raw material mixture is subjected to the desiliconizing treatment.

When each batch of the raw material mixture subject to the reduced pressure desiliconizing heat treatment is not more than about 100 g it is possible to obtain zirconia of sufficiently high purity even by a single-stage heat treatment at substantially a constant temperature in the range from about 1300° C. to 2000° C. However, when a larger batch of the raw material mixture is treated in the same manner it is often that the desiliconizing reaction remains incomplete in some portions of the batch so that the purity of the obtained zirconia powder does not reach a targeted value such as 98% or above. We have given special consideration to this problem, and finally we have devised the above stated two-stage heat treatment under reduced pressure and confirmed that zirconia powder of 99% or higher purity can surely be obtained by the method according to the invention even when more than 1 kg of the raw material mixture is treated as one batch.

In the reduced pressure desiliconizing heat treatment according to the invention the heating temperature at the first stage is limited to 1550° C. at the highest, since we have recognized that when the temperature is made higher than 1550° C. from the beginning of the desiliconizing treatment the dissociation of zircon into $ZrO_2$ and $SiO_2$ proceeds excessively rapidly and results in formation of a very dense phase of reaction products within the mixture under heat treatment by the action of fused $SiO_2$, whereby the development of SiO vapor is obstructed. When the raw material mixture contains a stabilizing agent such as MgO, CaO, $Y_2O_3$ or $CeO_2$ to produce stabilized or partially stabilized zirconia, obstruction to the development of SiO vapor is augmented by the products of reaction between $SiO_2$ and the stabilizing agent. The purpose of the first-stage heat treatment is gradually and almost completely desiliconizing zircon without suffering from the above explained obstructive phenomena. The lower boundary of the temperature range is set at 1200° C. because at lower temperatures the desiliconization takes a very long time and will possibly remain incomplete. At the second stage of the reduced pressure desiliconizing heat treatment the temperature is raised to above 1550° C. for the purpose of completely converting $SiO_2$ remaining in the mixture under treatment into gaseous SiO and completely expelling gaseous SiO from the solid phase of the reaction product. When producing stabilized or partially stabilized zirconia, the elevated temperature at the second-stage heat treatment is very effective for enhancement of the rate of diffusion of the stabilizing agent into $ZrO_2$ and, hence, for promotion of forming solid solution of $ZrO_2$ and the stabilizing oxide. At this stage the upper limit of the temperature is set at 2000° C. because the employment of a higher temperature is of little merit and leads to an unnecessary increase in the energy cost for the desiliconizing treatment.

To obtain a zirconia powder of very high purity, the mixing ratio of a carbonaceous or carbon-containing material to zircon powder is a matter of importance, and there is an optimum range. That is, it is necessary to prepare a raw material mixture such that the mole ratio of C contained in the carbon-containing material to $SiO_2$ in the zircon powder falls in the range from 0.4 to 2.0. If the carbon-containing material contains some carbon compounds which gasify at temperatures below about 1000° C., carbon in such compounds is neglected in calculating this $C/SiO_2$ mole ratio.

In principle, a zircon/carbon-containing material mixture in an arbitrary form can be subjected to the reduced pressure desiliconizing heat treatment according to the invention. For example, the raw material mixture may be in the form of powder, granules, lumps or a compacted body. However, in industrial practice of the invention it is rather unfavorable to use the raw material mixture in powder form because handling of a large quantity of powder is inconvenient and also because it is likely that $SiO_2$ separated from zircon by the desiliconizing heat treatment adheres to the container of the powder mixture and consequently intrudes into the obtained zirconia powder. Granulation of the raw material mixture entails considerable cost, and the granules are liable to partially crumble to powder during handling. Accordingly it is favorable to form the raw material mixture into solid bodies or lumps of suitable shape and size. In this regard, we have discovered that the efficiency of the desiliconizing heat treatment depends significantly on the bulk density of the compacted or otherwise formed bodies of the raw material mixture and that uniform and complete desiliconization can be accomplished at a relatively low temperature and in a relatively short time when the raw material mixture is in the form of a porous body or lump, or porous bodies or lumps, whose bulk density is in the range from 0.7 to 2.0. The desiliconizing heat treatment of such lumps will give zirconia in a lumped or agglomerated form, but the lumped or agglomerated zirconia can easily be disintegrated into a fine powder provided that a fine powder of zircon is used as the starting material.

Uniform mixing of a zircon powder with a carbon-containing material is a requisite for accomplishment of the object of the invention. Uniformity of the mixing can be enhanced by fluidizing at least a portion of the carbon-containing material mixed with zircon powder by moderate heating and/or by the addition of a suitable quantity of a solvent.

Sometimes a zirconia powder obtained by the desiliconizing heat treatment according to the invention contains small amounts of ZrO and/or ZrC, or solid solutions of such compounds, because usually it is necessary to use some excess of carbon compared with the theoretical quantity for achieving complete separation of silica from zircon. Therefore, it is recommended to subject the obtained zirconia powder to an oxidation treatment which is performed by heating the zirconia powder in an oxidizing atmosphere such as air at a temperature suitable for oxidation of ZrO and ZrC to $ZrO_2$. This oxidation treatment is effective also for dissipation of carbon possibly remaining in the zirconia powder into the gas phase.

With proper care in the above described points, it is possible to easily and surely obtain a zirconia powder having a purity of more than 99 wt% by the method according to the invention.

DESCRIPTION OF THE PREFERRED EMBODIMENT

Figure 1:
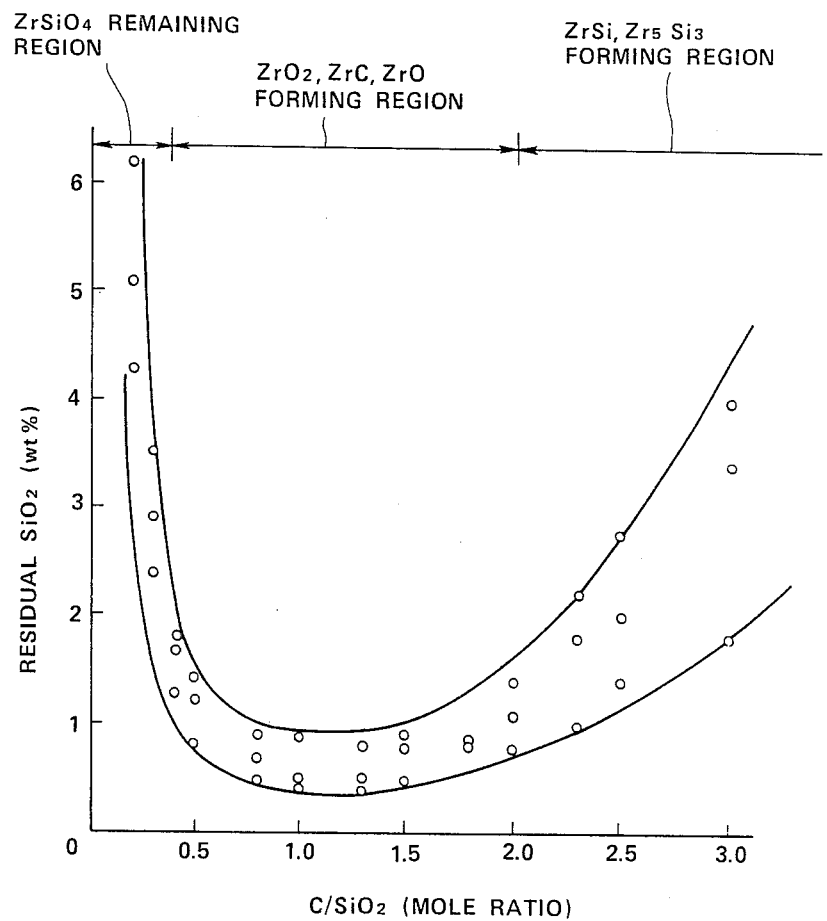
FIG. 1 shows the result of an experiment on the relationship between the $C/SiO_2$ mole ratio in a zircon-carbon mixture and the amount of $SiO_2$ contained in a zirconia powder obtained by desiliconizing heat treatment under reduced pressure.

In the present invention the raw materials are not particularly limited. As the primary material it suffices to use a zircon powder obtained by pulverizing a commercially available zircon sand. To enhance the rate of the desiliconizing reaction of the equation (1), it is desirable to use a zircon powder consisting of very fine particles. To obtain high purity zirconia, it is desirable to use a zircon powder low in the content of impurity components and a carbon-containing material low in ash content. A carbonaceous or carbon-containing material can be selected from almost purely carbon materials such as petroleum coke, coal coke and carbon black, less pure carbon materials such as petroleum pitch and coal pitch, and organic materials which are carbonized by heating in a nonoxidizing atmosphere, such as phenolic resin, polyethylene and polyvinyl alcohol. The mixing of a zircon powder and a powdery carbon-containing material may be carried out by any means insofar as well mixing is accomplished.

In the case of producing stabilized or partially stabilized zirconia, at least one stabilizing metal oxide selected from MgO, CaO, $Y_2O_3$ and $CeO_2$ is added to the mixture of zircon powder and carbon-containing material. Alternative to any of these metal oxides, it is possible to use a salt of the same metal which turns into the oxide when heated to a temperature not higher than the temperature employed in the subsequent desiliconizing heat treatment. Examples of suitable metal salts are $MgCO_3$, $CaCO_3$, $Ca(OH)_2$, $YCl_3.6H_2O$ and $Ce(NO_3)_3.6H_2O$. It is suitable that the total amount of the stabilizing oxide(s) falls in the range from 0.5 to 20 mole% of $ZrO_2$ contained in the zircon powder. If the amount of the stabilizing oxide is smaller it is impossible to obtain fully stabilized zirconia. On the other hand, when the stabilizing oxide is more than 20 mole% of $ZrO_2$ in the zircon powder the desiliconizing heat treatment of the raw material mixture will possibly result in the formation of a crystalline phase of a complex oxide such as, e.g., $CaZr_4O_9$ or $Zr_3Y_4O_{12}$ besides a $ZrO_2$ phase. When a zirconia powder containing such a complex oxide phase is sintered, the mechanical strength of the sintered body is not so high as is expected.

The efficiency of the desiliconizing heat treatment is affected by the proportion of carbon to silica in the raw material mixture, and there is an optimum range of the proportion of carbon to silica. That is, best results are obtained when the raw material mixture is prepared such that the mole ratio of C contained in the carbon material to $SiO_2$ contained in the zircon powder falls in the range from 0.4 to 2.0. In calculating this mole ratio $C/SiO_2$, carbon contained in hydrocarbons and other organic compounds that gasify at temperatures below about 1000° C. in a nonoxidizing atmosphere is neglected since the matter of concern is the amount of carbon that participates in the silica decomposing reaction at higher temperatures. It is preferable that the $C/SiO_2$ mole ratio is in the range from 0.6 to 1.6. The following is a description of an experiment concerning the $C/SiO_2$ mole ratio in the desiliconizing method according to the invention.

The zircon powder used in this experiment contained 99.5 wt% of $ZrO_2.SiO_2$ and had a mean particle size of 1.5 μm. The carbon material was a petroleum coke powder which contained 90 wt% of fixed carbon and 0.3% of ash and was not larger than 10 μm in particle size. These materials were well mixed in various proportions to obtain a number of sample mixtures in which the $C/SiO_2$ mole ratio ranged from 0.2 to 3.0. Using a press equipped with a metal die, each sample mixture was compacted into a pellet 20 mm in diameter and 20 mm in length. In an argon gas atmosphere of which the pressure was reduced to 0.01 atm, every sample pellet was fired at 1750° C. for 1 hr, and zirconia obtained by this desiliconizing heat treatment was subjected to an air oxidation treatment at 900° C. for the purpose of purification. After that each sample was analyzed to determine the quantity of residual $SiO_2$. FIG. 1 shows the results of this experiment.

As can be seen in FIG. 1, the quantity of $SiO_2$ remaining in the produced zirconia significantly increased when the $C/SiO_2$ mole ratio was smaller than 0.4. This is because of insufficiency of carbon for completely decomposing $SiO_2$ contained in zircon. However, the content of $SiO_2$ in the final product increased also when the $C/SiO_2$ mole ratio was greater than 2.0. In such cases the amount of carbon in the raw material mixture was sufficient to reduce entire $SiO_2$ in the zircon powder to SiO, but the existence of an excessively large amount of carbon caused undesirably intense reduction reactions to form zirconium silicides such as ZrSi and/or $Zr_5Si_3$. The zirconium silicides remain in the zirconia obtained by the reduced pressure firing process and become the cause of the presence of a considerable amount of silica in the zirconia after the oxidation treatment.

We have recognized the importance of very uniformly mixing a carbonaceous or carbon-containing material with a zircon powder for efficient separation of silica from zircon by the reduced pressure heat treatment. When the carbon-containing material is in the form of a fairly fine powder as in the case of petroleum coke or carbon black it is relatively easy to uniformly mix it with zircon powder. However, when using a relatively coarse powder of a carbon-containing material such as coal pitch, polyvinyl alcohol or polyethylene, simple mixing of such a powder with a zircon powder does not always give a truly uniform mixture and is liable to result in the existence of a relatively large amount of silica in the zirconia powder obtained by the desiliconizing heat reatment. In such a case it is effective to fluidize at least a portion of the carbon-containing material under mixing with zircon powder. The fluidization can be done by performing the mixing at a suitably elevated temperature or in the presence of a solvent for the carbon-containing material. The two fluidizing methods may be used jointly. The following is a description of an experiment on the effect of the fluidizing mixing method on the quality of the produced zirconia.

The zircon powder used in this experiment contained 99.5 wt% of $ZrO_2.SiO_2$ and had a mean particle size of 1.5 μm. As a carbon-containing material, a petroleum coke powder which contained 90 wt% of fixed carbon and was not larger than 44 μm in particle size, powdery coal pitch which contained 70 wt% of fixed carbon and was 50–200 μm in particle size, powdery polyvinyl alcohol which was 100–200 μm in particle size and powdery polyethylene which was 100–200 μm in particle size were alternately used. In each case the quantity of the carbon-containing material was adjusted such that the $C/SiO_2$ mole ratio in the resultant mixture became 1.3. In Run Nos. 1, 2, 5 and 7, the four kinds of carbon-containing materials were respectively mixed with the zircon powder at room temperature without using any solvent. In other runs using coal pitch, polyvinyl alcohol or polyethylene, the mixing was carried out in a heated state and/or in the presence of a small quantity of a solvent for the carbon-containing material. The particulars are shown in the following Table 1. In every run, the desiliconizing heat treatment of the raw material mixture was performed at 1600° C. for 2 hr in an argon gas atmosphere of which the pressure was 0.001 atm. The obtained zirconia powder was subjected to an air oxidation treatment which was performed at 800° C. for 2 hr. After that each sample was analyzed to determine the quantity of residual $SiO_2$. The results are shown in Table 1. As can be seen, the effect of fluidizing coal pitch, polyvinyl alcohol or polyethylene on the efficiency of desiliconizing was remarkable.

TABLE 1

| Run No. | C—containing Material; Particle Size | Fluidizing Method | $SiO_2$ in Zirconia (wt. %) |
|---|---|---|---|
| 1 | petroleum coke ≦44 μm | not fluidized | 1.1 |
| 2 | coal pitch 50–200 μm | not fluidize | 2.5 |
| 3 | coal pitch 50–200 μm | heating at 150° C. | 0.3 |
| 4 | coal pitch 50–200 μm | adding chloroform | 0.5 |
| 5 | PVA 100–200 μm | not fluidized | 5.2 |
| 6 | PVA 100–200 μm | adding water | 0.4 |
| 7 | polyethylene 100–200 μm | not fluidized | 6.1 |
| 8 | polyethylene 100–200 μm | adding toluene and heating at 80° C. | 0.3 |

Figure 2:
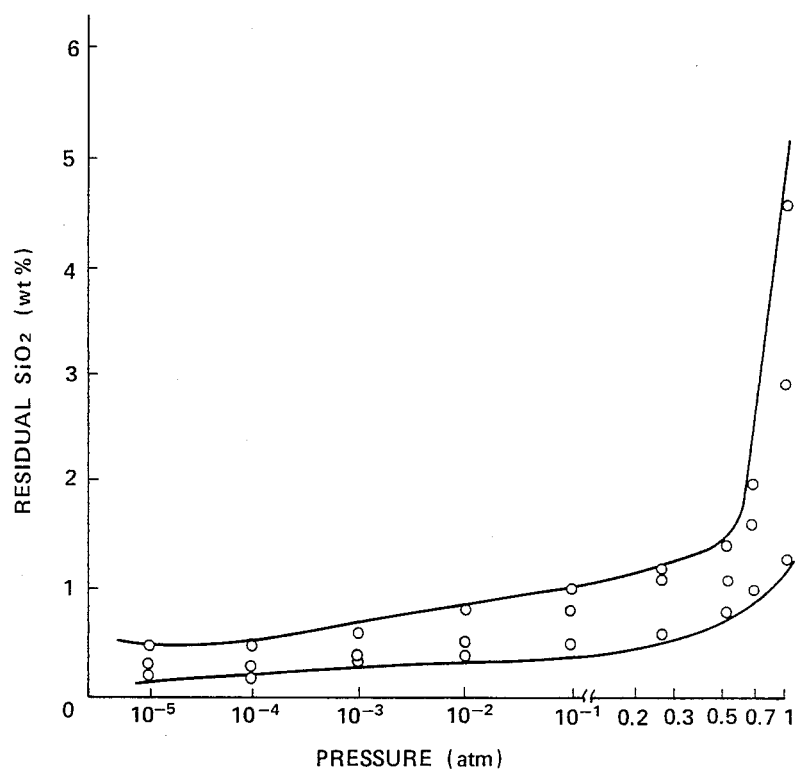
FIG. 2 shows the result of an experiment on the relationship between the pressure of an argon gas atmosphere in which a zircon-carbon mixture is heated and the amount of $SiO_2$ contained in the obtained zirconia powder.

The meaning of performing the desiliconizing heat treatment of the raw material mixture under reduced pressure is as explained hereinbefore. In this regard, FIG. 2 shows the result of an experiment which was conducted generally similarly to the above described experiment on the influence of the $C/SiO_2$ mole ratio except that in this case the $C/SiO_2$ mole ratio was constantly 1.3 and that the pressure of the argon gas atmosphere was varied over a wide range. In the present invention it is preferred to perform the desiliconizing heat treatment at a pressure not higher than 0.1 atm.

The following Tables 2 and 3 show the results of some additional experiments on desiliconization of zircon by heat treatment under reduced pressure. In every run of these experiments, 100 parts by weight of a zircon powder and a variable amount of a petroleum coke powder were mixed in a ball mill sometimes with addition of stabilizing oxide(s) in powder form. The zircon powder contained 99 wt% of $ZrO_2.SiO_2$ and had a mean particle size of 0.97 μm. The petroleum coke powder contained 90 wt% of fixed carbon and was smaller than 44 μm in particle size. In Run Nos. 1–6 shown in Table 2 the raw material mixtures were left in powder form. In Run Nos. 7–17 shown in Table 3 each raw material mixture was compacted into a pellet 20 mm in diameter and 20 mm in length. The desiliconizing heat treatment was made in an argon gas atmosphere. In these experiments the heating temperature at the desiliconizing heat treatment was kept substantially constant over the entire stage of the heat treatment. This was for the sake of simplicity and convenience of experiment. Zirconia powder obtained by the desiliconizing heat treatment was subjected to chemical analysis and also to X-ray diffraction analysis to identify the existing crystal phases. In the tables "$ZrO_2(m)$" stands for monoclinic zirconia, and "$ZRO_2(c)$" cubic zirconia. In the cases of stabilized or partially stabilized zirconia, every purity value in the tables indicates the total of $ZrO_2$ and the stabilizing oxide component. Then the zirconia powder was heated at 800°–900° C. in the atmospheric air to accomplish oxidation of the impurity components. After that chemical analysis and X-ray diffraction analysis were repeated.

TABLE 2

| Run No. | Carbon in Raw Mixture Petroleum Coke (parts by wt.) | C/SiO$_2$ (mole ratio) | Stabilizing Agent (mole %) | Desiliconizing Condition Temp. (°C.) | Time (hr) | Pressure (atm) | After Desiliconizing Treatment Crystal Phases | ZrO$_2$ Purity (wt %) | After Oxidation Treatment Crystal Phases | ZrO$_2$ Purity (wt %) |
|---|---|---|---|---|---|---|---|---|---|---|
| 1 | 11.0 | 1.5 | — | 1700 | 4 | 1 | ZrO$_2$(m), ZrO$_2$.SiO$_2$ | 89.2 | ZrO$_2$(m), ZrO$_2$.SiO$_2$ | 89.5 |
| 2 | 11.0 | 1.5 | — | 1700 | 2 | 0.8 | ZrO$_2$(m), ZrO$_2$.SiO$_2$ | 94.0 | ZrO$_2$(m), ZrO$_2$.SiO$_2$ | 94.3 |
| 3 | 11.0 | 1.5 | — | 1700 | 0.5 | 0.1 | ZrO$_2$(m), ZrC | 97.2 | ZrO$_2$(m) | 98.5 |
| 4 | 11.0 | 1.5 | — | 1550 | 2 | 0.01 | ZrO$_2$(m), ZrC, ZrO | 97.5 | ZrO$_2$(m) | 98.3 |
| 5 | 8.0 | 1.1 | MgO 3 | 1600 | 2 | 0.01 | ZrO$_2$(c), ZrO$_2$(m), ZrO | 97.3 | ZrO$_2$(c), ZrO$_2$(m) | 97.9 |
| 6 | 8.0 | 1.1 | CaO 3 | 1600 | 2 | 0.01 | ZrO$_2$(c) | 97.7 | ZrO$_2$(c) | 97.9 |

TABLE 3

| Run No. | Carbon in Raw Mixture Petroleum Coke (parts by wt.) | C/SiO$_2$ (mole ratio) | Stabilizing Agent (mole %) | Desiliconizing Condition Temp. (°C.) | Time (hr) | Pressure (atm) | After Desiliconizing Treatment Crystal Phases | ZrO$_2$ Purity (wt %) | After Oxidation Treatment Crystal Phases | ZrO$_2$ Purity (wt %) | Residual SiO$_2$ (wt %) |
|---|---|---|---|---|---|---|---|---|---|---|---|
| 7 | 8.8 | 1.2 | — | 1650 | 1 | 0.6 | ZrO$_2$(m) | 98.0 | ZrO$_2$(m) | 98.5 | 0.9 |
| 8 | 8.8 | 1.2 | — | 1650 | 1 | 0.01 | ZrO$_2$(m), ZrO | 97.7 | ZrO$_2$(m) | 98.8 | 0.5 |
| 9 | 2.2 | 0.3 | — | 1700 | 1 | 0.001 | ZrO$_2$(m), ZrO$_2$.SiO$_2$ | 95.8 | ZrO$_2$(m), ZrO$_2$.SiO$_2$ | 96.0 | 3.2 |
| 10 | 3.7 | 0.4 | — | 1700 | 1 | 0.001 | ZrO$_2$(m), ZrO | 97.1 | ZrO$_2$(m) | 98.2 | 1.0 |
| 11 | 11.0 | 1.5 | — | 1700 | 1 | 0.001 | ZrO$_2$(m), ZrO, ZrC | 97.8 | ZrO$_2$(m) | 98.7 | 0.7 |
| 12 | 21.9 | 3.0 | — | 1700 | 1 | 0.001 | ZrO$_2$(m), ZrO, ZrSi | 92.5 | ZrO$_2$(m), ZrO$_2$.SiO$_2$ | 96.7 | 2.5 |
| 13 | 11.0 | 1.5 | CaO 0.3 | 1750 | 1 | 0.01 | ZrO$_2$(m), ZrO$_2$(c) | 97.5 | ZrO$_2$(m), ZrO$_2$(c) | 98.7 | 0.5 |
| 14 | 11.0 | 1.5 | CaO 3, Y$_2$O$_3$ 5 | 1750 | 1 | 0.01 | ZrO$_2$(c), ZrC | 97.2 | ZrO$_2$(c) | 98.8 | 0.6 |
| 15 | 11.0 | 1.5 | CeO$_2$ 15 | 1750 | 1 | 0.01 | ZrO$_2$(c), ZrC | 97.0 | ZrO$_2$(c) | 98.9 | 0.5 |
| 16 | 8.8 | 1.2 | Y$_2$O$_3$ 7 | 1600 | 1 | 0.4 | ZrO$_2$(c), ZrO | 97.1 | ZrO$_2$(c) | 98.4 | 0.8 |
| 17 | 6.6 | 0.9 | CaO 10 | 1800 | 1 | 0.0001 | ZrO$_2$(c), ZrC | 97.9 | ZrO$_2$(c) | 99.3 | 0.1 |

According to the invention the reduced pressure heat treatment of the raw material mixture is performed in two stages as described hereinbefore. In principle the first-stage heat treatment at 1200°–1550° C. is for desiliconizing zircon in the raw material mixture. During the first-stage heat treatment a considerable portion of the separated silica will be converted into gaseous SiO which dissipates into the reduced pressure atmosphere. The second-stage heat treatment at 1550°–2000° C. is for complete conversion of the remaining silica into gaseous SiO and complete dissipation of gaseous SiO. Therefore, the first-stage heat treatment is carried out for a longer time than the second-stage heat treatment. Usually the first-stage heat treatment occupies at least 60% of the total time of the desiliconizing heat treatment. Both the first-stage heat treatment and the second-stage heat treatment must be performed under reduced pressure, viz. at pressures not higher than 0.6 atm, though the pressure may be different between the first-stage and the second-stage. It is preferred to perform the first-stage heat treatment at a temperature in the range from about 1300° C. to about 1500° C. and the second-stage heat treatment at a temperature in the range from about 1600° C. to about 1800° C. Preferably the first-stage heat treatment is immediately followed by the second-stage heat treatment. In that case, the second-stage heat treatment includes a transient period wherein the temperature is continuously raised from the level in the first-stage heat treatment up to the predetermined level in the second-stage heat treatment. If desired it is permissible to provide an interval between the first and second stages, but it entails considerable loss of heat energy.

As mentioned hereinbefore, purity of the zirconia powder obtained by the desiliconizing heat treatment under reduced pressure can be further enhanced by an oxidation heat treatment in air. The oxidation heat treatment is performed at a temperature in the range from 600° to 1400° C., and preferably in the range from about 800° to 1000° C.

EXAMPLES 1–4

For use in Examples 1 to 4, a mixture of a zircon powder and carbon black was prepared in a large quantity. The zircon powder contained 99 wt% of ZrO$_2$.SiO$_2$ and had a mean particle size of 1.5 μm. The carbon black contained 99 wt% of fixed carbon and 0.1 wt% of ash and had a mean particle size of 560 Å. The mixing ratio was such that in the obtained mixture the mole ratio of fixed carbin in the carbon black to SiO$_2$ contained in the zircon powder (C/SiO$_2$) became 1.2. After thorough mixing the powder mixture was compacted in a metal die into a large number of cylindrical bodies 10 mm in diameter and 20 mm in length.

In every example, 5 kg of the raw material mixture in the form of cylindrical bodies was subjected to desiliconizing heat treatment in an argon gas atmosphere of which the pressure was reduced to 0.1 atm. In every case the heat treatment was performed in two stages, but the particulars of the first- and second-stages of the heat treatment were different from example to example as shown in Table 4. In the beginning of the first-stage heat treatment and also at the transfer of the first-stage to the second-stage, the temperature was raised at a rate of 400° C./hr in Examples 1, 2 and 3 but at a rate of 50° C./hr in Example 4. In every example the zircon powder obtained by the two-stage heat treatment under reduced pressure was subjected to chemical analysis to examine purity and also to X-ray diffraction analysis to identify the existing crystal phases. After that the zirconia powder was heated at 800° C. for 2 hr in the atmospheric air to accomplish oxidation of the impurity components, and then chemical analysis and X-ray diffraction analysis were repeated. The results are shown in Table 4. In Table 4, "$ZrO_2(m)$" stands for monoclinic zirconia.

COMPARATIVE EXAMPLES 1 AND 2

In Comparative Examples 1 and 2, 5 kg of the above described mixture of zircon and carbon black in the form of cylindrical bodies were subjected to single-stage desiliconizing heat treatment in an argon gas atmosphere of which the pressure was reduced to 0.01 atm. The obtained zirconia powder was subjected to the oxidation heat treatment in the same manner as in the above examples. The desiliconizing conditions and the results of analysis of the products were as shown in Table 4.

so that the bulk density of the pellets becomes about 2.5 or higher. That is, this invention proposes to form the same powder mixture into lumps of considerably lower bulk density. In principle there is no strict lower limit to the bulk density of the porously lumped raw material mixture. However, it is suitable that the bulk density of the lumped raw material mixture is not lower than 0.7. When the bulk density is lower than 0.7 the lumps are insufficient in strength and are liable to crumble to powder and, therefore, offer inconvenience for handling. Besides, the weight of one batch of the raw material mixture that can be heat-treated in one furnace decreases, so that productivity lowers, as the bulk density of the lumped mixture becomes lower. Taking productivity of the desiliconizing operation too into consideration, it is preferable that the bulk density of the lumped raw material mixture is not lower than 1.0.

The method for forming the raw material mixture into porous lumps is arbitrary. For example, the forming method may be compaction by application of a moderate pressure, compaction or lumping with addition of a foaming agent or compaction or lumping with addition of an organic substance which gasifies or vaporizes at temperatures below the temperature at the first-stage of the desiliconizing heat treatment. When the carbon-containing material mixed with zircon powder is one which generates an ample gas by thermal decomposition at temperatures below 1000° C., it is possible to render the lumped raw material mixture porous by using the gas the carbon-containing material generates.

An experiment was carried out to examine the influences of the bulk density of the lumped raw material mixture on the quality of zirconia powder obtained by desiliconizing heat treatment. The zircon powder used in Examples 1–4 was mixed with a petroleum coke powder which contained 90 wt% of fixed carbon and had a mean particle size of 10 μm such that in the obtained mixture the mole ratio of fixed carbon in the petroleum coke powder to $SiO_2$ contained in the zircon powder ($C/SiO_2$) became 1.0. In the cases of some batches, $Y_2O_3$ or CaO was added to the mixture of zircon and petroleum coke. In mixing the powders, 1 to 3 wt% of polyvinyl alcohol was added as a binder together with a small amount of water. In a metal die the mixture was formed into large-sized blocks by application of a variable pressure which ranged from 0 to 500 kgf/cm². After drying each block of the raw material mixture was cut into a large number of 30-mm cubic blocks. The relationship between the forming pressure and the bulk density of the obtained block was as shown in Table 5. In the cases of blocks of relatively low bulk densities, a considerable portion of each block crumbled

TABLE 4

| | Desiliconizing Heat Treatment Conditions | | After Desiliconizing Treatment | | After Oxidation Treatment | |
|---|---|---|---|---|---|---|
| | Pressure (atm) | Temperature × Time | Crystal Phases | $ZrO_2$ Purity (wt %) | Residual $SiO_2$ (wt %) | $ZrO_2$ Purity (wt %) |
| Ex. 1 | 0.1 | 1st stage 1400° C. × 4 hr 2nd stage 1600° C. × 3 hr | $ZrO_2(m)$, ZrO | 98.4 | 0.063 | 99.2 |
| Ex. 2 | 0.1 | 1st stage 1500° C. × 2 hr 2nd stage 1700° C. × 2 hr | $ZrO_2(m)$, ZrO ZrC | 98.2 | 0.031 | 99.5 |
| Ex. 3 | 0.1 | 1st stage 1350° C. × 10 hr 2nd stage 1750° C. × 2 hr | $ZrO_2(m)$, ZrO | 98.1 | 0.025 | 99.4 |
| Ex. 4 | 0.1 | 1st stage 1300–1500° C. × 4 hr 2nd stage 1600–1750° C. × 3 hr | $ZrO_2(m)$, ZrO, ZrC | 98.1 | 0.079 | 99.3 |
| comp. Ex. 1 | 0.01 | 1450° C. × 10 hr | $ZrO_2(m)$, $ZrO_2·SiO_2$ | 98.1 | 0.65 | 98.4 |
| comp. Ex. 2 | 0.01 | 1700° C. × 3 hr | $ZrO_2(m)$, ZrO, ZrC | 96.5 | 0.37 | 98.7 |

In producing zirconia powder by the method according to the invention it is preferable to heat-treat the raw material mixture, i.e. mixture of zircon powder and a powdery carbon-containing material, in a compacted or lumped form for the reasons explained hereinbefore. However, when the raw material mixture is highly compacted as in the case of pelletization in conventional methods, it takes very long time to completely remove $SiO_2$ from the mixture by dissipation into the reduced pressure atmosphere as gaseous SiO so that the productivity of the desiliconizing operation becomes low. Furthermore, it is likely that the obtained zirconia powder is not uniform in quality particularly when the compacted bodies of the raw material mixture are large in size, because progress of grain growth and sintering in the surface region of each compacted body is to such an extent that considerable differences in material structure and grain size are produced between the surface region and the core region of the compacted body.

Figure 3:
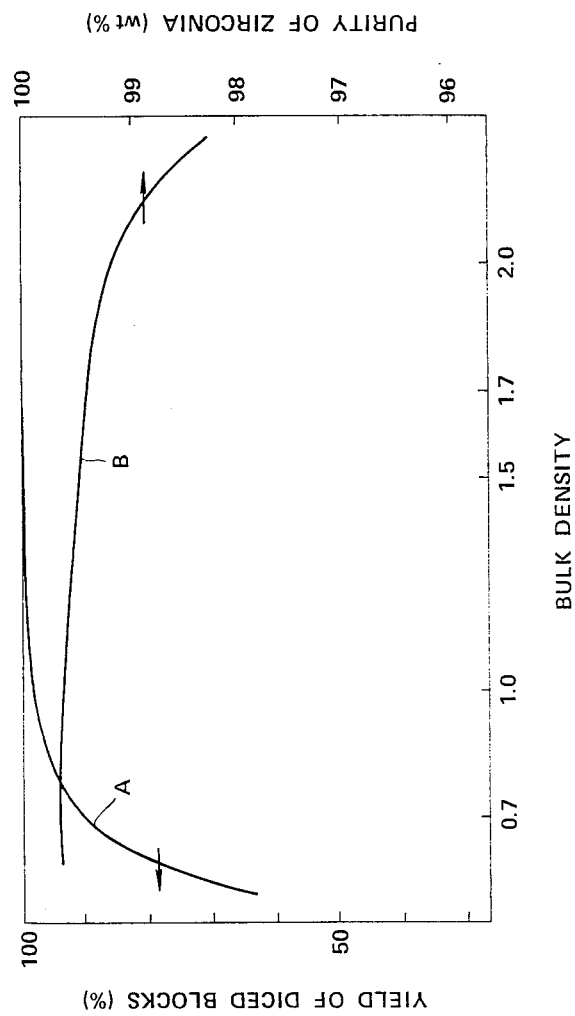
FIG. 3 shows the result of an experiment on the relationship between the bulk density of a lumped zircon-carbon mixture and the purity of zirconia powder obtained by desiliconizing heat treatment of the lumped mixture and also on the relationship between the bulk density and the degree of crumbling of the lumped mixture.

We have discovered that such demerit of high compaction of the raw material mixture can be obviated by forming the raw material mixture into a porous lump or porous lumps whose bulk density is not higher than 2.0. It is preferable that the bulk density is not higher than 1.7 from the viewpoint of shortening the duration of the desiliconizing heat treatment. For reference, in pelletizing a powder mixture of zircon and carbon it is usual to apply a compaction pressure of more than 500 kgf/cm² to powder while it was cut into the small cubic blocks. In FIG. 3 the curve A represents the relationship between the bulk density of the large-sized block and the yield of the 30-mm cubic blocks. The cubic blocks of each bulk density were subjected to desiliconizing heat treatment in an argon gas of which the pressure was reduced to 0.01 atm. The heat treatment was performed as a single-stage treatment at 1600° C. for 2 hr for the sake of simplicity and convenience of experiment. The obtained zirconia was subjected to oxidation heat treatment in air at 1000° C. for 2 hr. After that, disintegration of the obtained zirconia was performed by ball milling for 1 hr in dry state. The thus obtained zirconia powder was subjected to chemical analysis and measurement of particle size distribution. The results were as shown in Table 5. In FIG. 3 the curve B represents the dependence of the purity of the obtained zirconia powder on the bulk density of the blocks of the raw material mixture. The experimental data shown in Table 5 and FIG. 3 illustrate that zirconia powder of very high purity and narrow distribution of particle size can easily be obtained when the raw material mixture subject to desiliconizing heat treatment under reduced pressure is formed into lumps whose bulk density is 0.7-2.0, and preferably 1.0-1.7.

ber of 30-mm cubic blocks. The forming pressure was different from example to example so that the bulk density of the obtained blocks was veriable as shown in Table 6.

In every example, 10 kg of the raw material mixture in the form of cubic blocks was subjected to desiliconizing heat treatment in an argon gas atmosphere of which the pressure was reduced to 0.01 atm. The desiliconizing heat treatment was performed in two stages under the temperature and time conditions shown in Table 6. In the beginning of the first-stage heat treatment and also at the transfer from the first-stage to the second-stage, the temperature was raised at a rate of 400° C./hr in Examples 5, 6, 9, 10 and 11 but at a rate of 50° C./hr in Examples 7 and 8. In Example 10, the cubic blocks of the raw material mixture crumbled to powder when charged into the heat treatment furnace because of insufficient strength of the blocks. In every example the zirconia powder obtained by the two-stage heat treatment under reduced pressure was subjected to oxidation heat treatment which was carried out at 800° C. in the atmospheric air. After that the zirconia powder was analyzed to measure purity and the amount of residual $SiO_2$. In Examples 6, 8 and 9, the purity value in Table 6 indicates the total of $ZrO_2$ and the stabilizing oxide component.

TABLE 5

| | Raw Material Mixture | | | | Zirconia Powder after Desiliconizing Treatment and Oxidation Treatment | | | | | |
|---|---|---|---|---|---|---|---|---|---|---|
| Run No. | Forming Pressure (kgf/cm$^2$) | Bulk Density | Stabilizing Agent (mole %) | | Particle Size (μm) | | | Residual $SiO_2$ (wt %) | $ZrO_2$ Purity (wt %) | Type of Zirconia |
| | | | | | $D_{10}$ | $D_{50}$ | $D_{90}$ | | | |
| 1 | 0 | 0.61 | — | | 0.52 | 1.98 | 5.07 | 0.09 | 99.6 | unstabilized |
| 2 | 10 | 0.85 | $Y_2O_3$ | 3 | 0.57 | 2.09 | 5.95 | 0.10 | 99.6 | partially stabilized |
| 3 | 50 | 1.30 | — | | 0.57 | 2.30 | 6.45 | 0.11 | 99.5 | unstabilized |
| 4 | 50 | 1.20 | $Y_2O_3$ | 3 | 0.59 | 2.27 | 6.16 | 0.09 | 99.4 | partially stabilized |
| 5 | 50 | 1.43 | CaO | 14 | 0.99 | 3.66 | 7.74 | 0.23 | 99.3 | stabilized |
| 6 | 200 | 1.95 | — | | 0.87 | 3.43 | 7.68 | 0.32 | 99.2 | unstabilized |
| 7 | 200 | 1.88 | $Y_2O_3$ | 3 | 0.95 | 3.61 | 7.98 | 0.42 | 99.1 | partially stabilized |
| 8 | 500 | 2.30 | — | | 1.16 | 5.12 | 13.80 | 1.15 | 98.3 | unstabilized |
| 9 | 500 | 2.28 | CaO | 14 | 1.24 | 5.90 | 16.61 | 1.51 | 97.9 | stabilized |

EXAMPLES 5-11

The particulars of Examples 5-11 are shown in Table 6. In every example the principal components of the raw material mixture were the zircon powder used in Examples 1-4 and a petroleum coke powder containing 90 wt% of fixed carbon and having a mean particle size of 5 μm. The mixing ratio of these two materials was such that the mole ratio of fixed carbon in the petroleum coke to $SiO_2$ contained in the zircon powder ($C/SiO_2$) became 1.2. In Examples 6, 8 and 9, CaO and/or $Y_2O_3$ was added as stabilizing agent. In mixing the powders, about 1 wt% of polyvinyl alcohol was added as a binder together with a small amount of water. The raw material mixture was formed in a metal die into a large num-

COMPARATIVE EXAMPLES 3 AND 4

The particulars of Comparative Examples 3 and 4 are also shown in Table 6. The raw material mixtures were prepared and formed into 30-mm cubic blocks in the same manner as in Examples 5-11. The $C/SiO_2$ mole ratio was always 1.2. In Comparative Examples 3 and 4, 10 kg of the raw material mixture in the form of cubic blocks was subjected to single-stage desiliconizing heat treatment in an argon gas atmosphere of which the pressure was reduced to 0.01 atm. The obtained zirconia powder was subjected to the same oxidation treatment as in Examples 5-11 and then analyzed.

TABLE 6

| | Raw Material Mixture | | Bulk Density | Desiliconizing Heat Treatment (Temperature × Time) | After Oxidation Treatment | |
|---|---|---|---|---|---|---|
| | Stabilizing Agent (mole %) | | | | Residual $SiO_2$ (wt %) | $ZrO_2$ Purity (wt %) |
| Ex. 5 | — | | 1.6 | 1st stage 1500° C. × 4 hr<br>2nd stage 1650° C. × 1 hr | 0.051 | 99.5 |
| Ex. 6 | CaO | 3 | 1.5 | 1st stage 1500° C. × 4 hr<br>2nd stage 1650° C. × 1 hr | 0.065 | 99.4 |
| Ex. 7 | — | | 1.3 | 1st stage 1300-1500° C. × 5 hr<br>2nd stage 1700° C. × 1 hr | 0.025 | 99.6 |
| Ex. 8 | $Y_2O_3$ | 5 | 1.4 | 1st stage 1300-1500° C. × 5 hr<br>2nd stage 1700° C. × 1 hr | 0.031 | 99.6 |
| Ex. 9 | CaO<br>$Y_2O_3$ | 3<br>3 | 1.6 | 1st stage 1400° C. × 6 hr<br>2nd stage 1600° C. × 2 hr | 0.045 | 99.5 |
| Ex. 10 | — | | 0.5 | 1st stage 1500° C. × 4 hr | 1.05 | 98.5 |

TABLE 6-continued

| | Raw Material Mixture | | | After Oxidation Treatment | |
|---|---|---|---|---|---|
| | Stabilizing Agent (mole %) | Bulk Density | Desiliconizing Heat Treatment (Temperature × Time) | Residual SiO$_2$ (wt %) | ZrO$_2$ Purity (wt %) |
| Ex. 11 | — | 2.5 | 2nd stage 1650° C. × 1 hr 1st stage 1500° C. × 6 hr 2nd stage 1650° C. × 1 hr | 1.47 | 98.2 |
| Comp. Ex. 3 | — | 1.5 | 1600° C. × 5 hr | 0.25 | 94.5 |
| Comp. Ex. 4 | CaO    5 | 1.6 | ″ | 0.31 | 94.0 |

What is claimed is:

1. A method of producing a zirconia powder from zirconia containing SiO$_2$, comprising the steps of:

preparing a raw material mixture comprising said zircon powder containing said SiO$_2$ and a powdery carbon-containing material such that the mole ratio of C, which is contained in said carbon-containing material and does not gasify at temperatures below 1000° C. in a nonoxidizing atmosphere, to SiO$_2$ contained in said zircon powder is in the range from 0.4 to 2.0; and subjecting said raw material mixture to a desiliconizing heat treatment in a nonoxidizing atmosphere of which the presence is not higher than 0.6 atm, said desiliconizing heat treatment being a combination of a first-stage heat treatment which is performed at a temperature in the range from 1200° to 1550° C. for separating silica from said zircon powder and a second-stage heat treatment which is performed at a higher temperature in the range from above 1550° C. to 2000° C. for completely converting silica in the mixture under heat treatment into gaseous SiO and dissipating the gaseous SiO, wherein said raw material mixture is subjected to said desiliconizing heat treatment in the form of at least one lump whose bulk density is in the range from 0.7 to 2.0.

2. The method defined in claim 1, wherein said pressure is not higher than 0.1 atm.

3. The method defined in claim 1, wherein said first-stage heat treatment is performed at a temperature in the range from about 1300° C. to about 1500° C. and said second-stage heat treatment is performed at a temperature in the range from about 1600° C. to about 1800° C.

4. The method defined in claim 1, wherein said mole ratio of C to SiO$_2$ is in the range from 0.6 to 1.6.

5. The method defined in claim 1, further comprising the step of heating zirconia powder containing another zirconium compound selected from the group consisting of ZrC and ZrO as the product of said desiliconizing heat treatment in an oxidizing atmosphere at a temperature in the range from 600° to 1400° C. to thereby oxidize said other zirconium compound.

6. The method defined in claim 1, wherein said raw material mixture further comprises at least one metal oxide which can form a solid solution with zirconia and serves as a stabilizer for zirconia or metal salt which can be converted into said metal oxide by thermal decomposition at a temperature not higher than the temperature of said first-stage heat treatment.

7. The method defined in claim 6, wherein said at least one metal oxide is selected from the group consisting of CaO, MgO, Y$_2$O$_3$ and CeO$_2$.

8. A method defined in claim 7, wherein the total amount of said at least one metal oxide is in the range from 0.5 to 20 mole% of ZrO$_2$ contained in said zircon powder.

9. A method defined in claim 1, wherein said carbon-containing material is selected from the group consisting of carbon black, petroleum coke, coal coke, petroleum pitch, coal pitch, phenolic resin, polyvinyl alcohol and polyethylene.

* * * * *